(12) United States Patent
Hermann et al.

(10) Patent No.: US 10,628,735 B2
(45) Date of Patent: Apr. 21, 2020

(54) READING COMPREHENSION NEURAL NETWORKS

(71) Applicant: DeepMind Technologies Limited, London (GB)

(72) Inventors: Karl Moritz Hermann, London (GB); Tomas Kocisky, London (GB); Edward Thomas Grefenstette, London (GB); Lasse Espeholt, London (GB); William Thomas Kay, London (GB); Mustafa Suleyman, London (GB); Philip Blunsom, Oxford (GB)

(73) Assignee: Deepmind Technologies Limited, London (GB)

(*) Notice: Subject to any disclaimer, the term of this patent is extended or adjusted under 35 U.S.C. 154(b) by 994 days.

(21) Appl. No.: 15/172,074

(22) Filed: Jun. 2, 2016

(65) Prior Publication Data

US 2016/0358072 A1    Dec. 8, 2016

Related U.S. Application Data

(60) Provisional application No. 62/171,935, filed on Jun. 5, 2015.

(51) Int. Cl.
  *G06N 3/08* (2006.01)
  *G06N 3/04* (2006.01)
  *G06F 3/0484* (2013.01)

(52) U.S. Cl.
  CPC ............. *G06N 3/08* (2013.01); *G06F 3/0484* (2013.01); *G06N 3/0427* (2013.01); *G06N 3/0445* (2013.01); *G06N 3/0454* (2013.01)

(58) Field of Classification Search
  USPC .......................................................... 706/18
  See application file for complete search history.

(56) References Cited

U.S. PATENT DOCUMENTS 10,289,952 B2 * 5/2019 Das ...................... G06F 17/289
10,354,015 B2 * 7/2019 Kalchbrenner ...... G06N 3/0472
10,410,119 B2 * 9/2019 Grefenstette ........ G06N 3/0445
(Continued)

FOREIGN PATENT DOCUMENTS

WO    02/057961    7/2002

OTHER PUBLICATIONS

Bahdanau et al., "Neural Machine Translation by Jointly Learning to Align and Translate," (May 19, 2016) [online] (retrieved from https://arxiv.org/pdf/1409.0473v7.pdf), 15 pages.
(Continued)

*Primary Examiner* — Michael B Holmes
(74) *Attorney, Agent, or Firm* — Fish & Richardson P.C.

(57) ABSTRACT

Methods, systems, and apparatus, including computer programs encoded on computer storage media, for selecting answers to questions about documents. One of the methods includes receiving a document comprising a plurality of document tokens; receiving a question associated with the document, the question comprising a plurality of question tokens; processing the document tokens and the question tokens using a reader neural network to generate a joint numeric representation of the document and the question; and selecting, from the plurality of document tokens, an answer to the question using the joint numeric representation of the document and the question.

25 Claims, 8 Drawing Sheets

(56) References Cited

U.S. PATENT DOCUMENTS

| | | | | |
|---|---|---|---|---|
| 10,445,641 | B2* | 10/2019 | Srinivasan | G06N 3/08 |
| 2016/0232444 | A1* | 8/2016 | Fan | G06N 20/00 |
| 2019/0180165 | A1* | 6/2019 | Vinyals | G06N 3/02 |

OTHER PUBLICATIONS

Graves, "Supervised Sequence Labelling with Recurrent Neural Networks," vol. 385 of Studies in Computational Intelligence, Springer 2012 [online] (retrieved from https://www.cs.toronto.edu/~graves/preprint.pdf), 137 pages.

Gregor et al., "DRAW: A Recurrent Neural Network for Image Generation," (May 20, 2015) [online] (retrieved from https://arxiv.org/pdf/1502.04623v2.pdf), 10 pages.

Hinton et al., "Neural Networks for Machine Learning," Lectures 6a-e: Neural Networks for Machine Learning, (2012) [online] (retrieved from http://www.cs.toronto.edu/~tijmen/csc321/slides/lecture_slides_lec6.pdf), 31 pages.

Mnih et al., "Recurrent Models of Visual Attention," (Jun. 24, 2014) [online] (retrieved from http://arxiv.org/pdf/1406.6247v1.pdf), 12 pages.

Poon et al., "Machine Reading at the University of Washington," (Jun. 2010) [online] (retrieved from http://www.aclweb.org/anthology/W10-0911), 9 pages.

Riloff and Thelen, "A Rule-based Question and Answer System for Reading Comprehension Tests," (May 2000) [online] (retrieved from http://delivery.acm.org/10.1145/1120000/1117598/p13-riloff.pdf?ip=169.130.43.171&id=1117598&acc=OPEN&key=4D4702B0C3E38B35%2E4D4702B0C3E38B35%2E4D4702B0C3E38B35%2E6D218144511F3437&CFID=623908800&CFTOKEN=17488896&_acm_=1464822042_78e964ccffadc0801ba9ed25b1175277), 7 pages.

Sukhbaatar et al., "End-to-End Memory Networks," (Nov. 24, 2015) [online] (retrieved from http://arxiv.org/pdf/1503.08895v5.pdf), 11 pages.

Extended European Search Report issued in European Application No. 16172955.3, dated Nov. 15, 2016, 9 pages.

Tsukasa et al. "Natural language neural network and its application to question-answering system," Neurocomputing vol. 142, May 27, 2014, 8 pages.

* cited by examiner

READING COMPREHENSION NEURAL NETWORKS

CROSS-REFERENCE TO RELATED APPLICATION

This application claims priority to U.S. Provisional Application No. 62/171,935, filed on Jun. 5, 2015. The disclosure of the prior application is considered part of and is incorporated by reference in the disclosure of this application.

BACKGROUND

This specification relates to processing electronic documents using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short-term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes technologies that relate to processing electronic documents using neural networks.

Generally, a reading comprehension neural network system receives document tokens from an electronic document and question tokens from a question about the electronic document. The reading comprehension neural network processes the document tokens and the question tokens to determine an answer to the question. The answer to the question is one or more tokens from the document that the reading comprehension neural network system has determined best answer the question.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. Reading comprehension neural networks can be trained to effectively read real documents and answer complex questions with minimal prior knowledge of language structure. A trained reading comprehension neural network can achieve a higher accuracy on question answering and semantic analysis tasks as compared to state-of-the-art natural language processing systems, and can do so without any specific encoding of the document or query structure. A large scale training data set can be generated for training the reading comprehension neural networks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
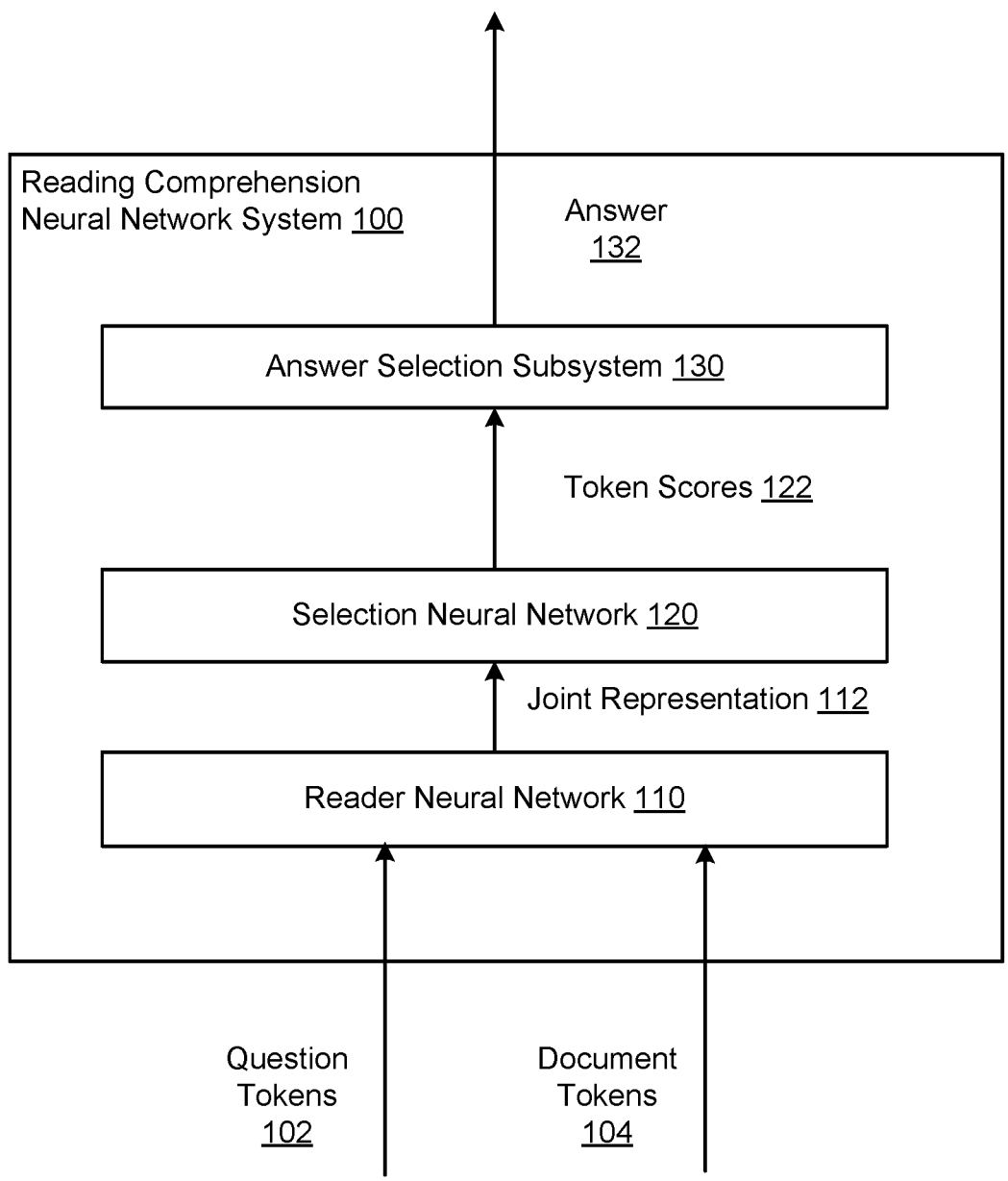
FIG. 1A shows an example reading comprehension neural network system.

FIG. 1A shows an example reading comprehension neural network system 100. The reading comprehension neural network system 100 is an example of a system implemented as computer programs on one or more computers in one or more locations in which the systems, components, and techniques described below are implemented.

The reading comprehension neural network system 100 receives an input document that is made up of multiple document tokens 102, e.g., words or phrases from the document, and a question about the input document that is made up of multiple question tokens 104, e.g., words or phrases from the question.

The reading comprehension neural network system 100 processes the document tokens 102 and the question tokens 104 to select a document token that is the answer to the question.

In particular, the reading comprehension neural network system 100 selects the answer using a reader neural network 110, a selection neural network 120, and an answer selection subsystem 130.

The reader neural network 110 is a neural network that is configured to receive the question tokens 102 and the document tokens 104 and to process the question tokens 102 and the document tokens 104 to generate a joint representation 112 of the document and the question. Generally, the joint representation 112 of the document and the question is a vector of numeric values. Example neural network architectures for the reader neural network 110 are described in more detail below with reference to FIGS. 2A-3C.

The selection neural network 120 is a neural network that is configured to receive the joint representation 112 to generate a set of token scores 122 that includes a respective token score for each of multiple token types. Generally, a token type is a word or phrase in a vocabulary of words or phrases, while a token belonging to the type is an instantiation of the word or phrase, i.e., an appearance of the word or phrase in a document. For example, a token type may be "cat," and a token of that type is an appearance of the word "cat" in a document.

In some implementations, the selection neural network 120 is a single neural network layer that multiplies the joint representation by a weight matrix that includes a respective row for each of the multiple token types and then applies a function, e.g., the exponential function, element-wise to the resulting vector to generate the token scores 122.

In some other implementations, the selection neural network 120 can include one or more other neural network layers, e.g., one or more fully connected layers, that collectively process the joint representation before the weight matrix is applied.

The answer selection subsystem 130 determines the answer to the question using the token scores 122. In particular, the answer selection subsystem 130 determines the highest-scoring token type and outputs a token of that token type as the answer to the question.

Figure 1B:
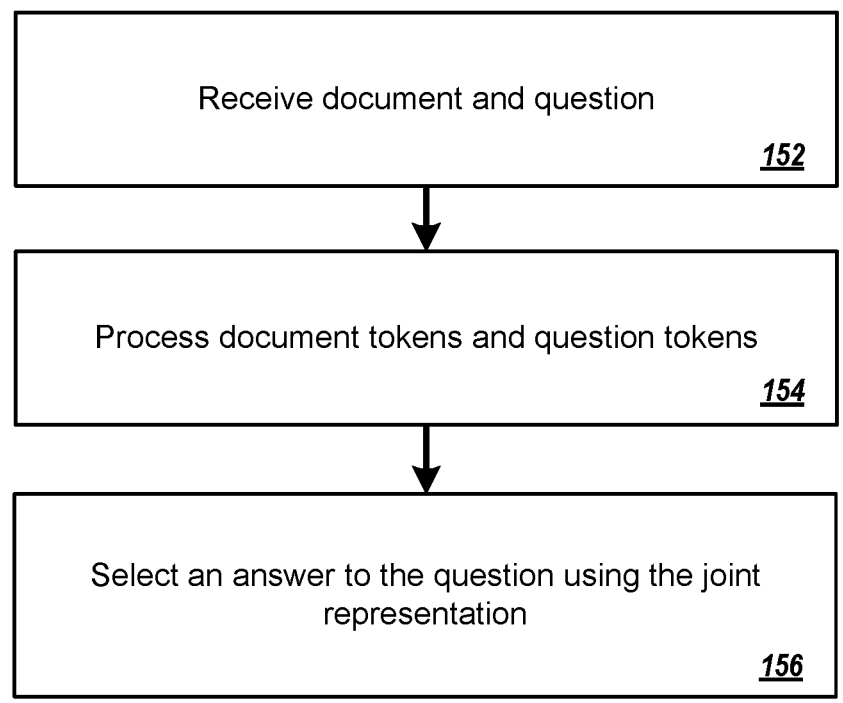
FIG. 1B is a flow diagram of an example process for selecting an answer to a question about a document.

FIG. 1B is a flow diagram of an example process 150 for selecting an answer to a question about a document. For convenience, the process 150 will be described as being performed by a system of one or more computers located in one or more locations. For example, a reading comprehension neural network system, e.g., the reading comprehension neural network system 100 of FIG. 1, appropriately programmed in accordance with this specification, can perform the process 150.

The system receives a document that is made up of multiple document tokens and a question that is made up of multiple document tokens (step 152).

The system processes the document tokens and the question tokens using a reader neural network to determine a joint numeric representation of the document and the question (step 154). Example reader neural networks that are configured to generate joint representations from input document tokens and question tokens are described in more detail below with reference to FIGS. 2A-3C.

The system selects an answer to the question using the joint numeric representation (step 156). In particular, the system processes the joint numeric representation using a selection neural network that is configured to process the joint numeric representation to generate a set of token scores. The set of token scores includes a respective token score for each of multiple token types. The system then selects a token that is of the highest-scoring token type as the answer to the question.

Figure 2A:
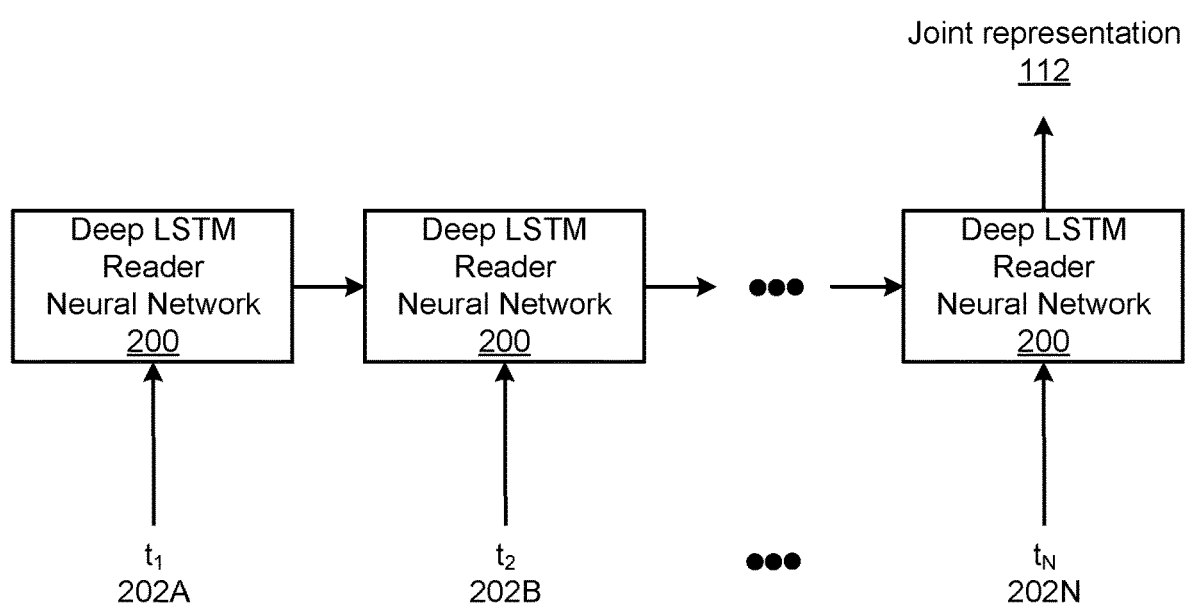
FIG. 2A shows an example deep Long Short-Term Memory (LSTM) reader neural network.

FIG. 2A shows an example deep Long Short-Term Memory (LSTM) reader neural network 200.

The deep LSTM reader neural network 200 is implemented by one or more computers and is configured to process a sequence of tokens 202A-202N to generate the joint representation 112 of a document and a question.

In particular, the sequence includes the document tokens from the document and the question tokens from the question. In some implementations, the sequence includes the document tokens followed by a designated delimiter token followed by the question tokens. In some other implementations, the sequence includes the question tokens followed by the designated delimiter token followed by the document tokens.

An example deep LSTM neural network that can be used as the reader neural network 200 is described in Alex Graves, *Supervised Sequence Labelling with Recurrent Neural Networks*, volume 385 of Studies in Computational Intelligence. Springer, 2012.

In some implementations, the described deep LSTM neural network is augmented with skip connections from the input to the deep LSTM neural network to each hidden LSTM layer in the deep LSTM neural network and from each hidden LSTM layer to an output layer of the deep LSTM neural network.

In these implementations, when the deep LSTM reader neural network 200 has K LSTM layers, the operations performed by the deep LSTM reader neural network 200 to generate an LSTM output y for the t-th token in the sequence of tokens can be specified as follows:

$$x'(t,k)=x(t)\|y'(t,k-1), y(t)=y'(t,1)\| \ldots \|y'(t,K)$$

$$i(t,k)=\sigma(W_{kxi}x'(t,k)+W_{khi}h(t-1,k)+W_{kci}c(t-1,k)+b_{ki})$$

$$f(t,k)=\sigma(W_{kxf}x'(t)+W_{hhf}h(t-1,k)+W_{kcf}c(t-1,k)+b_{kf})$$

$$c(t,k)=f(t,k)c(t-1,k)+i(t,k)\tan h(W_{kxc}x'(t,k)+W_{khc}h(t-1,k)+b_{ka})$$

$$o(t,k)=\sigma(W_{kxo}x'(t,k)+W_{kho}h(t-1,k)+W_{kex}c(t,k)+b_{ka})$$

$$h(t,k)=o(t,k)\tan h(c(t,k))$$

$$y'(t,k)=W_{ky}h(t,k)+b_{ky}$$

where $\|$ signifies vector concatenation, $h(t, k)$ is the hidden state for layer k as of token t, i, f, o are the input, forget, and output gates respectively, the Ws are respective weight matrices, and the bs are respective bias vectors.

That is, for each token 202A-202B, the deep LSTM neural network 200 processes the token to generate an LSTM output and to update the hidden states of the layers of the LSTM neural network 200. The output generated for the last token in the sequence can then be used as the joint representation 112.

Figure 2B:
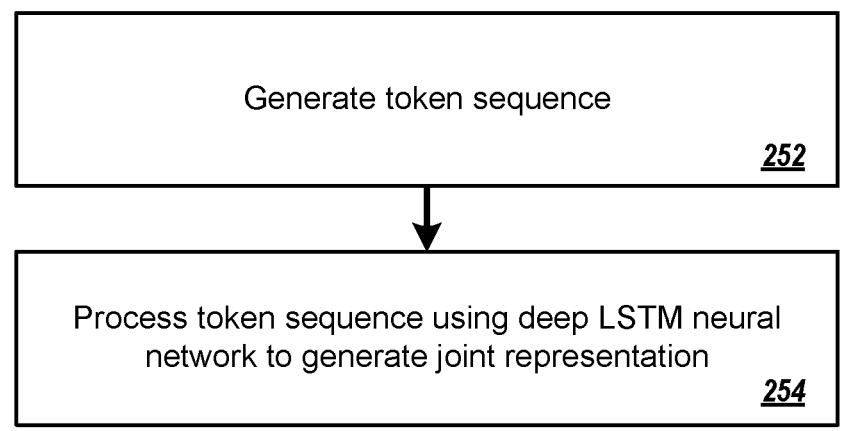
FIG. 2B is a flow diagram of an example process for generating a joint representation using a deep LSTM reader neural network

FIG. 2B is a flow diagram of an example process 250 for generating a joint representation using a deep LSTM reader neural network. For convenience, the process 250 will be described as being performed by a system of one or more computers located in one or more locations. For example, a reading comprehension neural network system, e.g., the reading comprehension neural network system 100 of FIG. 1, appropriately programmed in accordance with this specification, can perform the process 250.

The system generates a token sequence from the document tokens and the question tokens (step 252). In some implementations, the sequence includes the document tokens followed by a designated delimiter token followed by the question tokens. In some other implementations, the sequence includes the question tokens followed by the designated delimiter token followed by the document tokens.

The system processes the token sequence using a deep LSTM reader neural network to generate a joint representation of the document and the question (step 254). In particular, the deep LSTM reader neural network is configured to process each token in the token sequence to generate an LSTM output for each token. The joint representation is the output generated by the deep LSTM reader neural network after processing the last token in the token sequence.

Figure 3A:
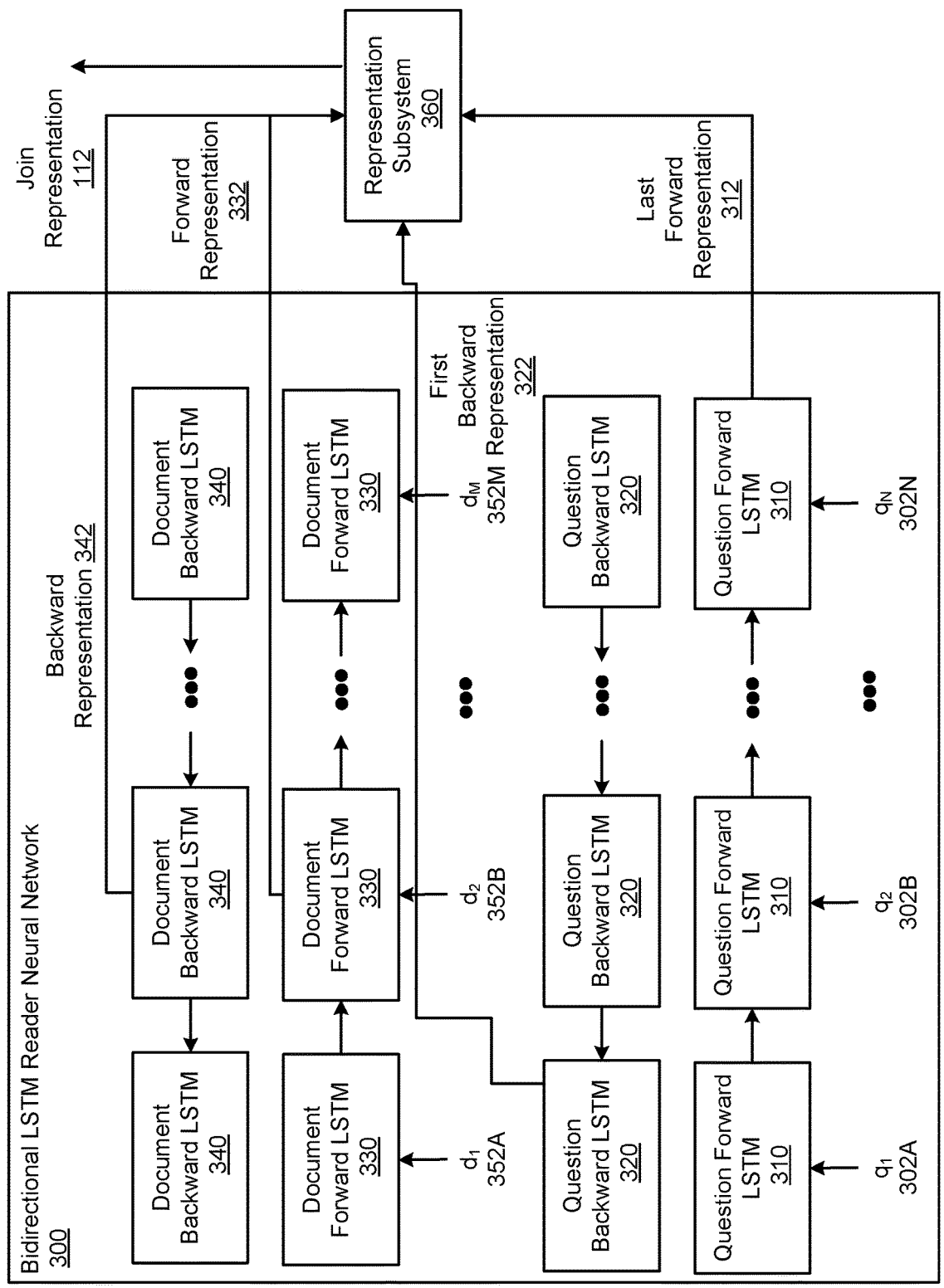
FIG. 3A shows an example bidirectional Long Short-Term Memory (LSTM) reader neural network.

FIG. 3A shows an example bidirectional Long Short-Term Memory (LSTM) reader neural network 300.

The bidirectional LSTM reader neural network 300 is implemented by one or more computers and includes a question forward LSTM neural network 310, a question backward LSTM neural network 320, a document forward LSTM neural network 330, a document backward LSTM neural network 340, and a representation subsystem 360.

The question forward LSTM neural network 310 and the question backward LSTM neural network 320 together make up a bidirectional LSTM neural network that is configured to process a sequence 302A-N of the question tokens in the received question.

In particular, the question forward LSTM neural network 310 is configured to process the question tokens 302A-N in the sequence in a forward order while the question backward LSTM neural network 320 is configured to process the question tokens 302A-N in the sequence in a backward order.

The question forward LSTM neural network 310 is configured to process each question token in the sequence to generate an output that will be referred to in this specification as a forward representation of the question token. The question backward LSTM neural network 320 is configured to process each question token in the sequence to generate an output that will be referred to in this representation as a backward representation of the question token.

The document forward LSTM neural network 330 and the document backward LSTM neural network 340 together make up a bidirectional LSTM neural network that is configured to process a sequence 352A-M of the document tokens in the received document.

In particular, the document forward LSTM neural network 330 is configured to process the document tokens 352A-M in the sequence in a forward order while the document backward LSTM neural network 340 is configured to process the document tokens 352A-M in the sequence in a backward order.

The document forward LSTM neural network 330 is configured to process each document token in the sequence to generate an output that will be referred to in this specification as a forward representation of the document token. The document backward LSTM neural network 340 is configured to process each document token in the sequence to generate an output that will be referred to in this representation as a backward representation of the document token.

Example bidirectional LSTMs that can be used to process the question sequence and the document sequence are described in more detail in Alex Graves, *Supervised Sequence Labelling with Recurrent Neural Networks*, volume 385 of Studies in Computational Intelligence. Springer, 2012.

The representation subsystem 360 uses representations generated by the question forward LSTM neural network 310, the question backward LSTM neural network 320, the document forward LSTM neural network 330, and the document backward LSTM neural network 340 to generate the joint representation 112 of the received document and the received question.

Generally, the representation subsystem 360 generates a composite question representation of the question from a forward representation 312 of the last document token in the sequence according to the forward order and from a backward representation 322 of the first document token in the sequence according to the forward order. For example, the representation subsystem 360 can concatenate the representations to generate the composite question representation.

The representation subsystem 360 also generates a composite representation of each document token from the forward representation of the document token and the backward representation of the document token, e.g., a composite representation of the document token 352B from the forward representation 332 of the document token 352B and the backward representation 342 of the document token 352B. For example, the representation subsystem 360 can concatenate the representations for a given document token to generate the composite representation of the document token.

The representation subsystem 360 then generates the joint representation 112 from the composite question representation and the composite representations of the document tokens. One example technique for generating the joint representation 112 is described in more detail below with reference to FIG. 3B. Another example technique for generating the joint representation 112 is described in more detail below with reference to FIG. 3C.

Figure 3B:
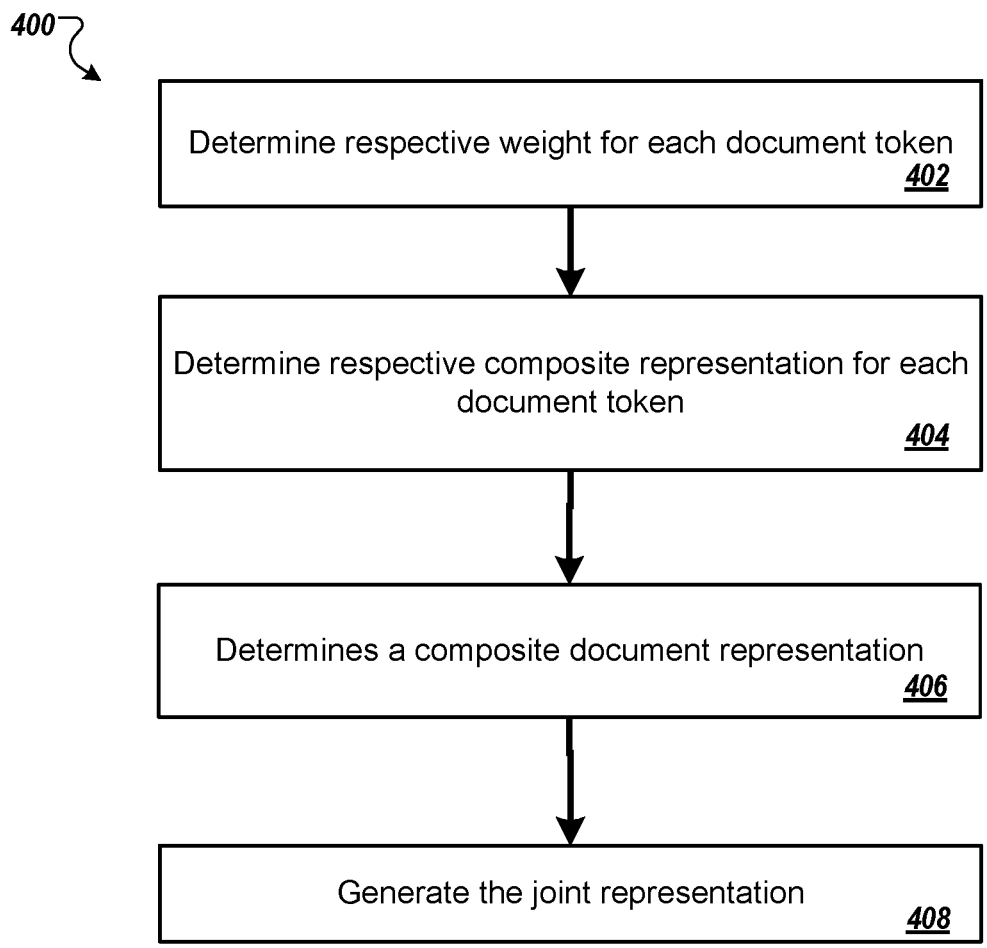
FIG. 3B is a flow diagram of an example process for generating a joint representation.

FIG. 3B is a flow diagram of an example process 400 for generating a joint representation. For convenience, the process 400 will be described as being performed by a system of one or more computers located in one or more locations. For example, a reading comprehension neural network system, e.g., the reading comprehension neural network system 100 of FIG. 1, appropriately programmed in accordance with this specification, can perform the process 400.

The system determines a respective weight for each document token (step 402). In particular, for each document token, the system generates the weight by processing the composite representation of the document token and the composite query representation through one or more composite neural network layers that are configured to receive the composite representation of the document token and the composite query representation and collectively process the composite representations to generate the respective weight for the document token.

For example, the operations performed by the one or more composite neural network layers to generate a weight s for a document token t may be of the form:

$$m(t) = \tan h(W_{yrn} y_d(t) + W_{um} u),$$

$$s(t) \propto \exp(w_{ms}^T m(t)),$$

where the Ws are respective weight matrices, w is a weight vector, u is the composite question representation, and $y_d(i)$ is the composite representation of the document token t.

The system determines a respective weighted composite representation for each document token by computing the product of the weight for the document token and the composite representation of the document token (step 404).

The system determines a composite document representation by combining, e.g., summing, the weighted composite representation of the document tokens (step 406).

The system generates the joint representation by combing the composite document representation and the composite question representation (step 408). In particular, the system processes the composite document representation and the composite question representation through a combining neural network layer that is configured to perform a non-linear combination of the representations to generate the joint representation.

Figure 3C:
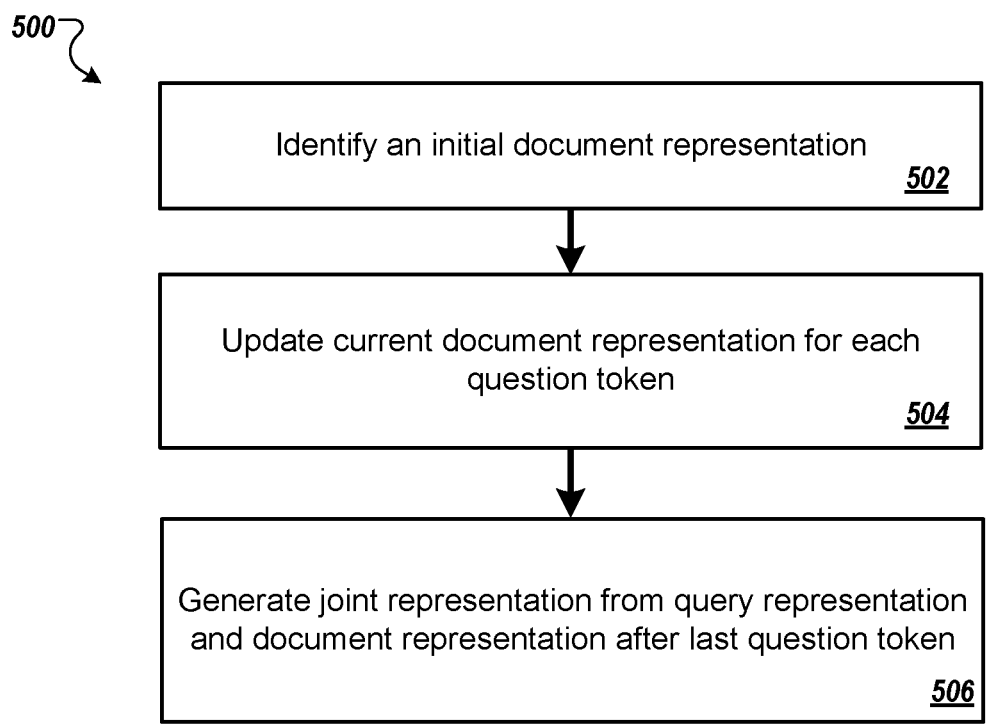
FIG. 3C is a flow diagram of another example process for generating a joint representation.

FIG. 3C is a flow diagram of another example process 500 for generating a joint representation. For convenience, the process 500 will be described as being performed by a system of one or more computers located in one or more locations. For example, a reading comprehension neural network system, e.g., the reading comprehension neural network system 100 of FIG. 1, appropriately programmed in accordance with this specification, can perform the process 500.

The system identifies an initial document representation (step 502). For example, the initial document representation can be a predetermined placeholder representation or may be learned by the system during training of the reader and selection neural networks.

The system updates a current document representation for each question token (step 504). That is, the system iterates through the question tokens, e.g., in the forward order, and, during each iteration, updates the document representation.

In particular, for a given question token and for each document token, the system processes the composite representation of the question token, the composite representation of the document token, and a current document representation for the document through one or more neural network layers to generate a respective weight for the document token. For example, for a question token i and document token t, the operations performed by the one or more neural network layers to generate a weight s for the document token t may be of the form:

$$m(i,t)=\tan h(W_{dm}y_d(t)+W_{rm}r(i-1)+W_{qm}y_q(i)),$$

$$s(i,t) \propto \exp(w_{ms}^T m(i,t)),$$

where the Ws are respective weight matrices, w is a weight vector, $y_q(i)$ is the composite representation of the question token i, $y_d(i)$ is the composite representation of the document token d, and r(i−1) is the current document representation. Like the composite representation of a document token, the composite representation of a question token may be a concatenation of the forward and backward representations of the question token.

The system then combines the composite representations of the document tokens in accordance with the updated weights for the document tokens to generate an updated document representation.

In some implementations, the updated document representation is a weighted sum of the composite representations of the document tokens.

In some other implementations, the updated document representation also considers the current document representation. For example, the updated document representation r(i) may satisfy:

$$r(i)=y_d^T s(i)+\tan h(W_{rr} r(i-1))$$

where $y^T$ is a matrix of composite representations of document tokens, s is a vector of the weights for the question token i, and W is a weight matrix.

The system generates the joint representation by combing the composite document representation after the last question token and the composite question representation (step 506). In particular, the system processes the composite document representation after the last question token and the composite question representation through a combining neural network layer that is configured to perform a non-linear combination of the representations to generate the joint representation.

To determine trained values of the parameters of the reader neural network and the selection neural network, the system trains the networks jointly using an end-to-end training procedure, i.e., by obtaining labeled training data and performing a neural network training technique, e.g., asynchronous RmsProp as described in Geoffrey Hinton with Nitish Srivastava and Kevin Swersky, "Lectures 6a-e: Neural Networks for Machine Learning," available at http://www.cs.toronto.edu/~tijmen/csc321/slides/lecture_slides_lec6.pdf, 2012.

In some implementations, the system obtains a collection of documents and summary text for each document in the collection and generates some or all of the training data that is to be used for training the networks.

Figure 4:
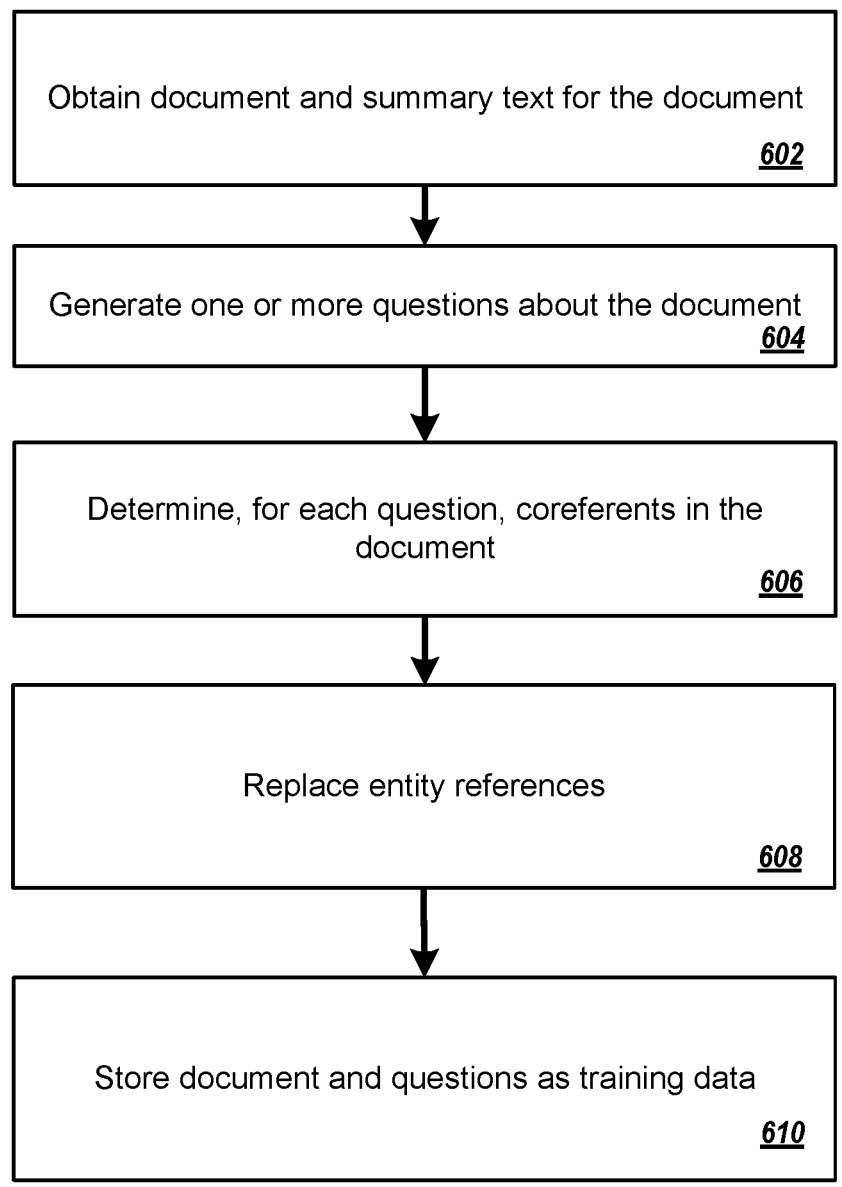
FIG. 4 is a flow diagram of an example process for generating training data for the reader neural network and the selection neural network.

FIG. 4 is a flow diagram of an example process 600 for generating training data for the reader neural network and the selection neural network. For convenience, the process 600 will be described as being performed by a system of one or more computers located in one or more locations. For example, a reading comprehension neural network system, e.g., the reading comprehension neural network system 100 of FIG. 1, appropriately programmed in accordance with this specification, can perform the process 600.

The system obtains a document and summary text for the document (step 602). For example, the summary text may be text that supplements an article with a number of bullet points, summarizing aspects of the information contained in the document.

The system generates one or more questions about the document from the summary text (step 604). In particular, the system can generate a question from a piece of summary text by converting the summary text into a Cloze form question by replacing an entity in the summary text with a placeholder. The answer to the Cloze form question is then the entity that was replaced with the placeholder.

The system determines, for each question, coreferents in the document for entity references in the question using a coreference system (step 606).

The system replaces entity references in the document and in each question with abstract entity markers (step 608). In particular, for each question, the system replaces each entity reference in the question that has a coreferent in the document with the same abstract entity marker as the coreferent for the entity reference.

The system stores the document and the one or more questions as training data (step 608). In some implementations, the system also generates, from a particular document and a particular question about the documents, additional training data by randomly permuting the abstract entity markers in the particular document and the particular question.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving a document comprising a plurality of document tokens;
   receiving a question associated with the document, the question comprising a plurality of question tokens;
   processing the document tokens and the question tokens using a reader neural network to generate a joint numeric representation of the document and the question, including
      processing the document tokens using a document neural network to generate a respective numeric representation of the document tokens,
      processing the question tokens using a question neural network to generate a respective numeric representation of the question tokens, and
      generating the joint numeric representation of the document and the question by combining the representation of the document tokens and the representation of the question tokens; and
   selecting, from the plurality of document tokens, an answer to the question using the joint numeric representation of the document and the question.

2. The method of claim 1, wherein the respective numeric representation of the document tokens, the respective numeric representation of the question tokens, and the joint numeric representation of the document and the question are a vectors of numeric values.

3. The method of claim 1, wherein selecting the answer to the question using the joint numeric representation of the document and the question comprises:
   processing the joint numeric representation using a selection neural network to generate a respective token score for each of a plurality of token types; and
   selecting a token that is of a highest-scoring token type as the answer to the question.

4. The method of claim 1, wherein the document neural network comprises a document forward long short-term memory (LSTM) neural network and a document backward LSTM neural network, and wherein generating a respective numeric representation of the document tokens further comprises:
   processing each document token in a forward order using the document forward LSTM neural network to generate a respective forward representation for each document token;
   processing each document token in a backward order using the document backward LSTM neural network to generate a respective backward representation of the document; and
   for each document token, combining the forward representation of the document token and the backward representation of the document token to generate a composite representation of the document token.

5. The method of claim 4, wherein the question neural network comprises a question forward LSTM neural network and a question backward LSTM neural network, and wherein generating a respective numeric representation of the question tokens further comprises:
   processing each question token in a forward order using the question forward LSTM neural network to generate a respective forward representation for each question token;
   processing each question token in a backward order using the question backward LSTM neural network to generate a respective backward representation of each question token;
   for each question token, combining the forward representation of the question token and the backward representation of the question token to generate a composite representation of the question token; and
   combining the forward representation of the last question token and the backward representation of the first question token to generate a composite question representation of the question.

6. The method of claim 5, wherein generating the joint numeric representation of the document and the question comprises:
   identifying an initial document representation for the document;
   for each question token:
      processing the composite representation of the question token, the composite representations of the document tokens, and a current document representation for the document through one or more neural network layers to update a respective weight for each document token, and
      combining the composite representations of the document tokens in accordance with the updated weights for the document tokens to generate an updated document representation; and
   generating the joint representation by combining the document representation after the last question token and the composite question representation.

7. The method of claim 1, wherein the question neural network comprises a question forward long short-term memory (LSTM) neural network and a question backward LSTM neural network, and wherein generating a respective numeric representation of the question tokens comprises:
   processing each question token in a forward order using the question forward LSTM neural network to generate a forward representation of the question;
   processing each question token in a backward order using the question backward LSTM neural network to generate a backward representation of the question; and
   combining the forward representation of the question and the backward representation of the question to generate a composite question representation.

8. The method of claim 7, wherein the document neural network comprises a document forward LSTM neural network and a document backward LSTM neural network, and wherein generating a respective numeric representation of the document tokens comprises:
   processing each document token in a forward order using the document forward LSTM neural network to generate a respective forward representation for each document token;

processing each document token in a backward order using the document backward LSTM neural network to generate a respective backward representation of the document; and for each document token, combining the forward representation of the document and the backward representation of the document to generate a composite representation of the document token.

9. The method of claim 8, wherein generating the joint numeric representation of the document and the question comprises:

determining a respective weight for each document token;

determining, for each document token, a weighted composite representation by computing the product of the weight for the document token and the composite representation of the document token;

determining a composite document representation by combining the weighted composite representations of the document tokens; and generating the joint representation by combining the composite document representation and the composite question representation.

10. The method of claim 9, wherein determining the respective weight for each document token comprises:

processing the composite representation of the document token and the composite query representation through one or more neural network layers to generate the weight for the document token.

11. A system comprising one or more computers and one or more storage devices storing instructions that, when executed by one or more computers, cause the one or more computers to perform operations comprising:

receiving a document comprising a plurality of document tokens;

receiving a question associated with the document, the question comprising a plurality of question tokens;

processing the document tokens and the question tokens using a reader neural network to generate a joint numeric representation of the document and the question, including using a document neural network to generate a respective numeric representation of the document tokens, using a question neural network to generate a respective numeric representation of the question tokens, and generating the joint numeric representation of the document and the question by combining the representation of the document tokens and the representation of the question tokens; and selecting, from the plurality of document tokens, an answer to the question using the joint numeric representation of the document and the question.

12. The system of claim 11, wherein selecting the answer to the question using the joint numeric representation of the document and the question comprises:

processing the joint numeric representation using a selection neural network to generate a respective token score for each of a plurality of token types; and selecting a token that is of a highest-scoring token type as the answer to the question.

13. The system of claim 11, wherein the document neural network comprises a document forward long short-term memory (LSTM) neural network and a document backward LSTM neural network, and wherein generating a respective numeric representation of the document tokens further comprises:

processing each document token in a forward order using the document forward LSTM neural network to generate a respective forward representation for each document token;

processing each document token in a backward order using the document backward LSTM neural network to generate a respective backward representation of the document; and for each document token, combining the forward representation of the document token and the backward representation of the document token to generate a composite representation of the document token.

14. The system of claim 13, wherein the question neural network comprises a question forward LSTM neural network and a question backward LSTM neural network, and wherein generating a respective numeric representation of the question tokens comprises:

processing each question token in a forward order using the question forward LSTM neural network to generate a respective forward representation for each question token;

processing each question token in a backward order using the question backward LSTM neural network to generate a respective backward representation of each question token;

for each question token, combining the forward representation of the question token and the backward representation of the question token to generate a composite representation of the question token; and combining the forward representation of the last question token and the backward representation of the first question token to generate a composite question representation of the question.

15. The system of claim 14, wherein generating the joint numeric representation of the document and the question comprises:

identifying an initial document representation for the document;

for each question token:

processing the composite representation of the question token, the composite representations of the document tokens, and a current document representation for the document through one or more neural network layers to update a respective weight for each document token, and combining the composite representations of the document tokens in accordance with the updated weights for the document tokens to generate an updated document representation; and generating the joint representation by combining the document representation after the last question token and the composite question representation.

16. The system of the question neural network comprises a question forward long short-term memory (LSTM) neural network and a question backward LSTM neural network, and wherein generating a respective numeric representation of the question tokens comprises:

processing each question token in a forward order using the question forward LSTM neural network to generate a forward representation of the question;

processing each question token in a backward order using the question backward LSTM neural network to generate a backward representation of the question; and combining the forward representation of the question and the backward representation of the question to generate a composite question representation.

17. The system of claim 16, wherein the document neural network comprises a document forward LSTM neural network and a document backward LSTM neural network, and wherein generating a respective numeric representation of the document tokens comprises:
  processing each document token in a forward order using the document forward LSTM neural network to generate a respective forward representation for each document token;
  processing each document token in a backward order using the document backward LSTM neural network to generate a respective backward representation of the document; and
  for each document token, combining the forward representation of the document and the backward representation of the document to generate a composite representation of the document token.

18. The system of claim 17, wherein generating the joint numeric representation of the document and the question comprises:
  determining a respective weight for each document token;
  determining, for each document token, a weighted composite representation by computing the product of the weight for the document token and the composite representation of the document token;
  determining a composite document representation by combining the weighted composite representations of the document tokens; and
  generating the joint representation by combining the composite document representation and the composite question representation.

19. The system of claim 18, wherein determining the respective weight for each document token comprises:
  processing the composite representation of the document token and the composite query representation through one or more neural network layers to generate the weight for the document token.

20. One or more non-transitory computer storage media encoded with instructions that, when executed by one or more computers, cause the one or more computers to perform operations comprising:
  receiving a document comprising a plurality of document tokens;
  receiving a question associated with the document, the question comprising a plurality of question tokens;
  processing the document tokens and the question tokens using a reader neural network to generate a joint numeric representation of the document and the question, including
    using a document neural network to generate a respective numeric representation of the document tokens,
    using a question neural network to generate a respective numeric representation of the question tokens, and
    generating the joint numeric representation of the document and the question by combining the representation of the document tokens and the representation of the question tokens; and
  selecting, from the plurality of document tokens, an answer to the question using the joint numeric representation of the document and the question.

21. The non-transitory computer storage media of claim 20, wherein selecting the answer to the question using the joint numeric representation of the document and the question comprises:
  processing the joint numeric representation using a selection neural network to generate a respective token score for each of a plurality of token types; and
  selecting a token that is of a highest-scoring token type as the answer to the question.

22. The non-transitory computer storage media of claim 20, wherein the question neural network comprises a question forward long short-term memory (LSTM) neural network and a question backward LSTM neural network, and wherein generating a respective numeric representation of the question tokens comprises:
  processing each question token in a forward order using the question forward LSTM neural network to generate a forward representation of the question;
  processing each question token in a backward order using the question backward LSTM neural network to generate a backward representation of the question; and
  combining the forward representation of the question and the backward representation of the question to generate a composite question representation.

23. The non-transitory computer storage media of claim 22, wherein the document neural network comprises a document forward LSTM neural network and a document backward LSTM neural network, and wherein generating a respective numeric representation of the document tokens comprises:
  processing each document token in a forward order using the document forward LSTM neural network to generate a respective forward representation for each document token;
  processing each document token in a backward order using the document backward LSTM neural network to generate a respective backward representation of the document; and
  for each document token, combining the forward representation of the document and the backward representation of the document to generate a composite representation of the document token.

24. The non-transitory computer storage media of claim 23, wherein generating the joint numeric representation of the document and the question comprises:
  determining a respective weight for each document token;
  determining, for each document token, a weighted composite representation by computing the product of the weight for the document token and the composite representation of the document token;
  determining a composite document representation by combining the weighted composite representations of the document tokens; and
  generating the joint representation by combining the composite document representation and the composite question representation.

25. The non-transitory computer storage media of claim 24, wherein determining the respective weight for each document token comprises:
  processing the composite representation of the document token and the composite query representation through one or more neural network layers to generate the weight for the document token.

* * * * *